US005530835A

United States Patent [19]
Vashi et al.

[11] Patent Number: 5,530,835
[45] Date of Patent: Jun. 25, 1996

[54] COMPUTER MEMORY DATA MERGING TECHNIQUE FOR COMPUTERS WITH WRITE-BACK CACHES

[75] Inventors: Amit D. Vashi, Easley; Terry S. Strickland, Greenville, both of S.C.

[73] Assignee: NCR Corporation, Dayton, Ohio

[21] Appl. No.: 761,609

[22] Filed: Sep. 18, 1991

[51] Int. Cl.$^6$ .................................................. G06F 12/08
[52] U.S. Cl. ........................ 395/474; 395/448; 395/470; 364/DIG. 1; 364/228.1; 364/243.44
[58] Field of Search .............................. 364/200 MS File, 364/900 MS File; 395/400 MS File, 425 MS File, 200.08, 447, 448, 470, 474

[56] References Cited

U.S. PATENT DOCUMENTS

| | | | |
|---|---|---|---|
| 3,771,137 | 11/1973 | Barner et al. | 395/425 |
| 3,781,812 | 12/1973 | Wymore et al. | 395/400 |
| 3,984,818 | 10/1976 | Gnadeberg et al. | 395/425 |
| 4,150,364 | 4/1979 | Baltzer | 340/703 |
| 4,157,586 | 6/1979 | Gannon et al. | 395/425 |
| 4,168,541 | 9/1979 | DeKarske | 365/49 |
| 4,315,312 | 2/1982 | Schmidt | 395/425 |
| 4,439,829 | 3/1984 | Tsiang | 395/425 |
| 4,445,172 | 4/1984 | Peters et al. | 395/403 |
| 4,467,443 | 8/1984 | Shima | 395/425 |
| 4,525,777 | 6/1985 | Webster et al. | 395/425 |
| 4,527,238 | 7/1985 | Ryan et al. | 395/425 |
| 4,577,293 | 3/1986 | Matick et al. | 365/189.04 |
| 4,630,195 | 12/1986 | Hester et al. | 395/375 |
| 4,631,668 | 12/1986 | Kubo et al. | 395/250 |
| 4,680,702 | 7/1987 | McCarthy | 395/775 |
| 4,797,813 | 1/1989 | Igarashi | 395/425 |
| 4,858,111 | 8/1989 | Steps | 395/425 |
| 4,926,317 | 5/1990 | Wallach et al. | 395/403 |
| 4,942,518 | 7/1990 | Weatherford et al. | 395/800 |
| 4,995,041 | 2/1991 | Hetherington et al. | 371/40.1 |
| 5,019,971 | 5/1991 | Lefsky et al. | 395/250 |
| 5,023,776 | 6/1991 | Gregor | 395/449 |
| 5,025,365 | 6/1991 | Mathur et al. | 395/600 |
| 5,034,885 | 7/1991 | Matoba et al. | 395/425 |
| 5,043,886 | 8/1991 | Witek et al. | 395/470 |
| 5,058,006 | 10/1991 | Durdan et al. | 395/449 |
| 5,073,851 | 12/1991 | Masterson et al. | 395/425 |
| 5,075,846 | 12/1991 | Reininger et al. | 364/400 |
| 5,091,846 | 2/1992 | Sachs et al. | 395/250 |
| 5,091,851 | 2/1992 | Shelton et al. | 395/425 |
| 5,119,485 | 6/1992 | Ledbetter, Jr. et al. | 395/425 |
| 5,123,099 | 6/1992 | Shibata et al. | 395/425 |
| 5,123,101 | 6/1992 | Sindhu | 395/400 |
| 5,146,573 | 9/1992 | Sato et al. | 395/425 |
| 5,146,603 | 9/1992 | Frost et al. | 395/425 |
| 5,155,824 | 10/1992 | Edenfield et al. | 395/425 |
| 5,155,843 | 10/1992 | Stamm et al. | 395/575 |

FOREIGN PATENT DOCUMENTS

| | | |
|---|---|---|
| 0176972 | 4/1986 | European Pat. Off. . |
| 0310446 | 4/1989 | European Pat. Off. . |
| 0379769 | 7/1989 | European Pat. Off. . |
| 2178205 | 2/1987 | United Kingdom . |

OTHER PUBLICATIONS

"82385 High Performance 32–Bit Cache Controller"; pp. 1–11; Oct. 1987; printed in U.S.A.

*Primary Examiner*—Matthew M. Kim
*Attorney, Agent, or Firm*—Douglas S. Foote; Paul J. Maginot

[57] ABSTRACT

A memory controller intercepts data bytes destined for a memory and selectively combines them with data bytes previously read from the memory. The controller also blocks data bytes destined for the memory corresponding to data bytes previously written to the memory. The memory controller includes an input device and an output device. An output line of the input device is connected to both the memory and an input line of the output device. Also, the memory is connected to the input line of the output device.

23 Claims, 1 Drawing Sheet

COMPUTER MEMORY DATA MERGING TECHNIQUE FOR COMPUTERS WITH WRITE-BACK CACHES

The present invention relates to a computer memory system. More particularly, it relates to a memory controller and method for quickly transferring data to and from the memory.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer's main or system memory. A high speed memory may employ SRAMs for use as a processor cache memory. The theory behind memory hierarchy is to group instructions and data to be executed by the system processor in the highest speed memory. Such high speed memory is typically the most expensive memory available, so economics dictate that it be relatively small. System memory consisting of DRAMs is denser and less expensive than a cache memory with SRAMs, and can therefore be significantly larger than the cache memory.

In many computer systems, typically large systems, the system memory (DRAM) may be connected to multiple processors, each having its own cache. During operation, each processor transfers instructions and data from system memory to its cache in order to have quick access to the variables of the currently executing program.

As data in a cache is modified by a processor, the data may either be immediately updated in the system memory or it may be updated later. A "write-through" cache writes data to system memory when it is updated whereas a "write-back" cache writes updated data to system memory only when directed. A computer system using only write-through caches always has the most recent data in system memory. In contrast, in a system having write-back caches the most recent data may be in a cache and not the system memory. Thus, whenever a processor wishes to access data from system memory, write-back caches must be checked for the data. If a write-back cache "owns" the data and the data has been modified, it is typically written to system memory so that it can be read by the requesting processor.

For example, consider a system memory which stores multiple byte data elements and a certain data element has been transferred to the cache of a first processor. If a second processor wishes to read all or part of the data element, the fact that the data element is "owned" by the first processor must be determined. This is usually done while attempting to read the data element from memory (a first memory access). If the element has been modified, it is retrieved from the first processor and written into system memory (a second memory access). The data element is then read from memory (a third memory access) and transferred to the second processor. Thus, three memory accesses are required to obtain valid data.

Similar delays are encountered when attempting to overwrite into system memory one or more bytes of a data element owned by another processor. For example, one or more data bytes of a data element are transferred from a first processor to system memory. If the data element is owned by a second processor, modified data bytes or the entire data element are written to system memory. If the modified data bytes from the second processor overwrite those from the first processor, the data bytes from the first processor must again be written to memory.

OBJECTS OF THE INVENTION

It is therefore an object of the present invention to provide a new and improved memory controller for a computer system.

It is another object of the present invention to provide a new and improved method for transferring data to and from a system memory.

It is a further object of the present invention to provide a method for reducing access time to the system memory of a computer.

It is yet another object of the present invention to provide a more efficient method for transferring data to and from a memory in a computer system.

SUMMARY OF THE INVENTION

One form of the present invention is a memory controller which provides byte level data merging on data elements being written to and read from a memory. For memory reads, the controller intercepts data bytes destined for a memory and selectively combines them with data bytes previously read from the memory. For memory writes, the controller blocks data bytes destined for a memory corresponding to data bytes previously written to the memory.

The controller includes an input and output device. The input device has an output connected to the memory. The input device receives one or more incoming data bytes and combines them into a data element. The output device, which is connected to both the memory and output of the input device, selectively combines data bytes from the memory and input device to form a multi-byte data element. The input device also selectively blocks data bytes destined for the memory.

Other forms of the present invention are methods for merging data bytes on reads from memory and writes to memory. For reading, a multi-byte data element is read from the memory. Data bytes, destined for the memory, are intercepted, and selectively combined with the multi-byte data element. For writing, selected bytes of a multi-byte element are written from a first source to the memory. Bytes of the same data element are written from a second source to the memory while data bytes corresponding to those bytes previously written are blocked.

BRIEF DESCRIPTION THE DRAWINGS

FIG. 1 is a diagram of a controller for a computer memory according to one form of the present invention.

DESCRIPTION OF A PREFERRED EMBODIMENT

Figure 1:
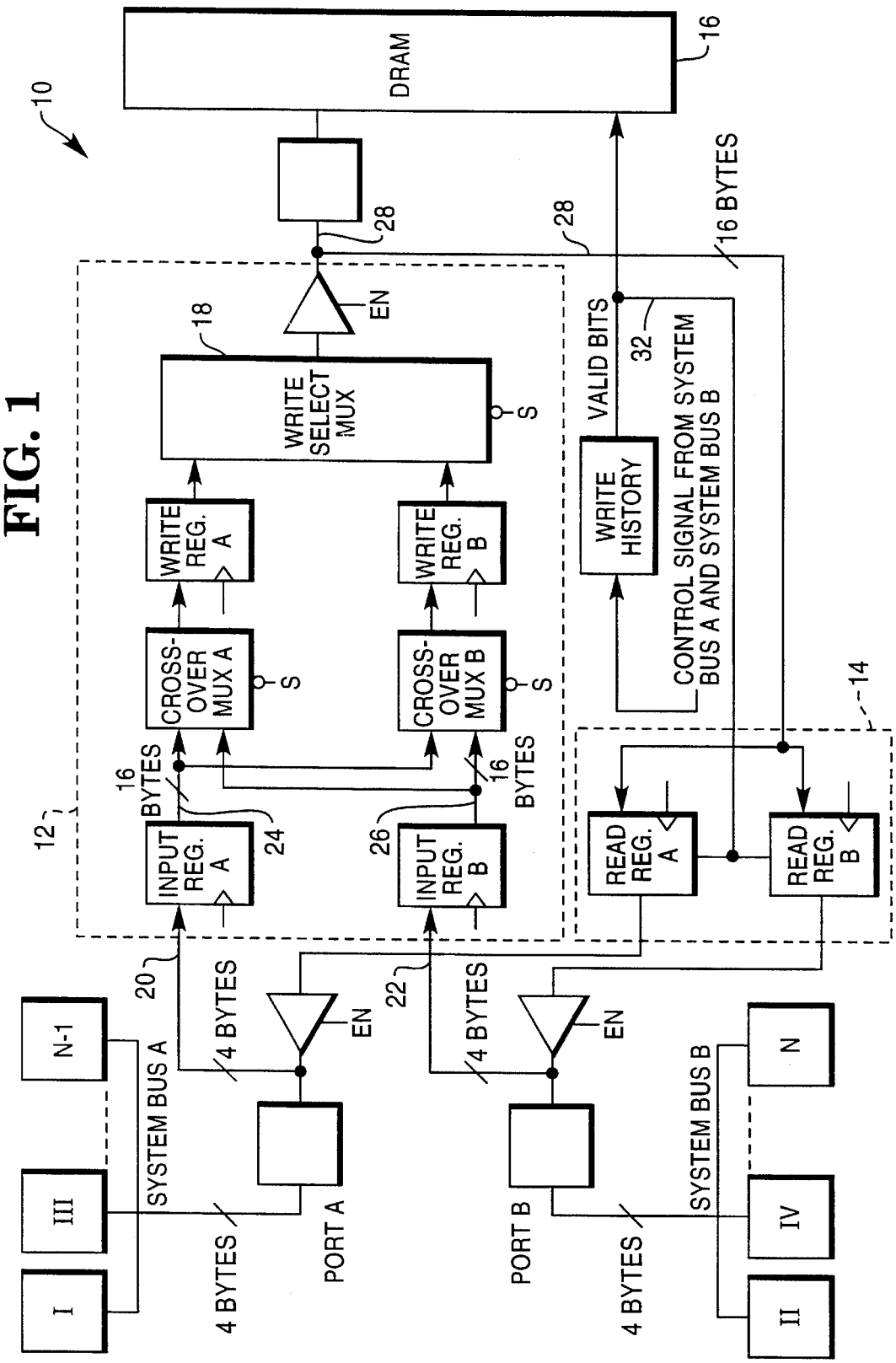

FIG. 1 shows a DRAM controller 10 according to one form of the present invention. Controller 10 is connected by port A to system bus A and by port B to system bus B. A number of processors I, III, . . . N-1 are connected to bus A and a number of processors II, IV, . . . N are connected to bus B. Controller 10 includes an input device 12, an output device 14, DRAM memory 16 and a WRITE HISTORY block. Both input device 12 and output device 14 are connected to both system buses A and B. DRAM 16 is connected to an output line 28 of input device 12. Output device 14 is connected to both DRAM 16 and output line 28 of input device 12.

Input device 12 includes input registers A and B, crossover multiplexers A and B, write registers A and B and write select multiplexer 18. In a preferred embodiment, input lines 20 and 22 for input registers A and B, respectively, each have a width of four bytes. Output lines 24 and 26 from input registers A and B, respectively, each have a width of sixteen bytes. Thus, up to four data bytes at a time may be received by each input register A and B, and up to sixteen successive data bytes may be stored in each input register A and B.

The inputs of crossover multiplexers A and B are connected to the output of both input register A and input register B. Each multiplexer A and B has a control input S for selecting the data bytes in either input register A or B. The selected data bytes are directed to either write register A or write register B, as will be described more fully. Write select multiplexer 18 allows the contents of write registers A or B to be directed to output line 28 of input device 12.

Output device 14 is connected to both input device 12 and memory 16 by line 28. Output device 14 includes read register A and read register B, the outputs of each being connected to system bus A and system bus B, respectively. In a preferred embodiment, each read register A and B includes sixteen parallel byte-wide latches. The data input line to each read register A and B is connected to line 28. Output device 14 is also connected to the WRITE HISTORY block by a control line 32. Line 28 has a width of sixteen bytes whereas line 32 has a width of sixteen bits. Each bit on line 32 corresponds to a data byte on line 28. Each bit on line 32 enables a corresponding latch in read register A and B thereby determining which data bytes appearing on line 28 are latched into read register A or B.

Another feature of this system is that the microprocessors connected to buses A and B each have an internal write-through cache and an associated second level write-back cache. In a preferred embodiment, each write-back cache stores data elements with a line length of sixteen bytes. The write-back cache transfers data to DRAM 16 through input device 12 and receives data from DRAM 16 through output device 14. Whenever a sixteen byte data element is read from DRAM 16 into one of the write-back caches, a flag is set (not shown) in controller 10 indicating ownership of that data element. The flag can either identify the specific processor having ownership of the data element or it can generally identify that the data element is owned by an unspecified processor.

Each system bus A and B has a width of four bytes. Thus, a transfer of all sixteen bytes of a data element between a processor cache and DRAM controller 10 requires four cycles.

In operation, data elements will frequently be written to or read from DRAM 16 by various processors. Each memory access (read or write) to DRAM 16 is accompanied by a table look-up of whether the subject data element is owned by another processor. For each such "hit" a request is made for the owning processor to write back to DRAM 16 any bytes in the data element which it has modified.

Consider first a write operation from processor I on system bus A. One or more data bytes of a sixteen byte data element are transferred to input register A. The data bytes are combined in input register A to form either a partial (<16 bytes) or complete (16 byte) data element. Line 24 is then selected by crossover multiplexer A and the data element is transferred to write register A. At the same time bits are set in WRITE HISTORY corresponding to the bytes within the data element which are being written to write register A.

When access to DRAM 16 is granted, write select multiplexer 18 provides the data element in write register A to line 28 from where it is transferred to DRAM 16. DRAM 16 is byte addressable, so only bytes having a valid bit provided by WRITE HISTORY are written into DRAM 16. At the same time DRAM 16 is written, a table (not shown) in memory is checked to determine if the data element is owned by another processor. The look-up table tracks whether data elements in DRAM 16 are stored in a cache memory associated with a microprocessor. In other words, the look-up table indicates whether a given data element is "owned" by another microprocessor. If so, a request is made for any modified bytes in the data element to be written to DRAM 16.

If the data element is owned by processor II on system bus B, any modified data bytes are transferred to input register B. After the data bytes are assembled in input register B, line 26 is selected by crossover multiplexer A and the data element is transferred to write register A. Bits are again set in WRITE HISTORY corresponding to the bytes within the data element which are being written to write register A. However, the valid bits will not be set for bytes previously written during the initial write operation from processor I. When access to DRAM 16 is granted, write select multiplexer 18 provides the data element in write register A to line 28 from where it is transferred to DRAM 16. Once again only bytes having a valid bit provided by WRITE HISTORY are written into DRAM 16. By blocking data bytes corresponding to those previously written to DRAM 16, the valid data bytes in DRAM 16 is retained.

Consider next a read from DRAM 16 initiated by processor I on system bus B. When memory access is granted, a sixteen byte data element is read from DRAM 16 and transferred into read register A. At the same time DRAM 16 is read, the look-up table in memory is checked by comparing the address of the data element with entries in the look-up table. If it is determined that the data element is owned by another processor, a request is made for any modified bytes of the data element to be written to DRAM 16. If the data element is owned by processor II on system bus B, any modified data bytes are transferred from processor II's cache memory to input register B. After the data bytes are assembled in input register B, line 26 is selected by crossover multiplexer A and the data element is transferred to write register A. Bits are again set in WRITE HISTORY corresponding to the bytes within the data element which are being written to write register A. When access to DRAM 16 is granted, write select multiplexer 18 provides the data element in write register A to line 28 from where it is transferred to DRAM 16. Once again only bytes having a valid bit provided by WRITE HISTORY are written into DRAM 16. At the same time, the bytes having a corresponding valid bit are intercepted by output device 14. The term "intercept" as used herein means to capture or obtain without interfering with the primary transfer. Thus, modified data bytes destined for DRAM 16 are both available to DRAM 16 as well as output device 14. The valid bits from WRITE HISTORY enable only the modified bytes to be transferred to read register A. The bytes modified by processor II are selectively combined with the data bytes in register A by overwriting corresponding data bytes in read register A. In this manner, a merged data element is formed in read register A for transfer to processor A without requiring an additional DRAM access. At the same time, the modified data bytes are written to DRAM 16 to update the data element.

The present invention provides quick response for read and writes to a system memory. In the preceding example, the requesting processor obtains valid data without having to wait for additional read and write cycles to DRAM 16.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A memory controller comprising:

an input device, connected to a first processor and a second processor, which receives one or more incoming data bytes from the first processor and combines them to form a first data element;

a memory which stores therein a second data element having one or more data bytes, said memory being connected to an output of the input device for receiving the first data element and overwriting a portion of the second data element therewith; and an output device, connected to the first processor and the second processor, which receives data bytes of the second data element from the memory and data bytes of the first data element from the input device and combines them to form a third data element which is subsequently transmitted to the second processor, wherein the first processor and the second processor each transfers data to the memory though said input device and receives data from the memory through the output device.

2. The controller of claim 1 wherein a first system bus is connected between said input device and the first processor, and a second system bus is connected between said output device and the second processor.

3. The controller of claim 2 wherein the first processor and the second processor each includes a write-back cache memory for transferring data to said memory through said input device and receiving data from said memory through said output device.

4. The controller of claim 1 wherein said input device is connected to two system buses and wherein said input device includes:

first and second input registers which receive data bytes from said two system buses; and a first multiplexer, connected between said memory and registers, and having a control input for selecting data bytes from either of said registers.

5. The controller of claim 4 wherein said input device further includes:

a second multiplexer, connected between said memory and registers, and having a control input for selecting data bytes from each of said registers.

6. The controller of claim 5 wherein said input device further includes:

first and second write registers connected between said first and second multiplexers, respectively, and said memory.

7. The controller of claim 6 wherein said input device further includes:

a third multiplexer connected between said memory and first and second write registers.

8. The controller of claim 1 wherein said output device is connected to two system buses and wherein said output device includes:

first and second read registers, each register having a data input line connected to both the memory and output of the input device.

9. The controller of claim 8 wherein said output device further includes:

a control gate, connected between the registers and data input line, for selecting which data bytes appearing on the data input line to latch into an read register.

10. A memory controller comprising:

means for storing a first set of data bytes which are read from a memory, said storing means being connected to a first processor and a second processor;

means for intercepting a second set of data bytes being transferred from the first processor to the memory, said intercepting means being connected to the first processor and the second processor; and means for overwriting a portion of the first set of data bytes stored in the storing means with the second set of data bytes intercepted by the intercepting means so as to form a third set of data bytes which is subsequently transferred to the second processor.

11. The controller of claim 10 wherein said intercepting means includes an input device connected to said memory for holding the second set of data bytes destined for said memory.

12. The controller of claim 11 wherein said storing means includes an output device having an input line connected to both the memory and input device.

13. The controller of claim 12 wherein said output device has a control gate, connected to the input line, for enabling the interception of each data byte of the second set of data bytes.

14. The controller of claim 13 wherein said input and output device are each connected to two system buses.

15. A method for transferring a data element within a computer system, the computer system having a first processor, a second processor and a system memory, comprising the steps of:

reading a first data element from the system memory into a first register;

transferring a second data element from a cache memory of the first processor to a second register;

obtaining selected bytes of the second data element from the second register to overwrite corresponding bytes of the first data element in the first register so as to form a third data element in the first register; and reading the third data element from the first register into the second processor.

16. The method of claim 15 further comprising:

determining, prior to transferring the second data element, that said second data element is stored in said cache memory of the first processor.

17. The method of claim 16 wherein said determining step includes comparing an address of said second data element with entries stored in the system memory to determine if said second data element is stored in the cache memory of the first processor.

18. The method of claim 17 wherein said cache memory of said first processor is a second level write-back cache memory.

19. A method comprising:

reading a first data element from a computer system memory into a register;

intercepting a second data element which is being transferred from a cache memory of a first processor to the computer system memory;

overwriting a portion of the first data element with the second data element intercepted in the intercepting step so as to form a third data element in the register; and reading the third data element from the register into a second processor.

20. A method comprising:

writing bytes of a first data element from a first cache memory of a first processor to a computer system memory; and writing selected bytes of a second data element from a second cache memory of a second processor to said computer system memory so as to overwrite a portion of the first data element and form a third data element in the computer system memory.

21. A memory controller comprising:

means for storing a first set of data bytes which are read from a computer system memory, said storing means being connected to a first processor and a second processor;

means for intercepting a second set of data bytes being transferred from the first processor to the computer system memory, said intercepting means being connected to the first processor and the second processor;

means for overwriting a portion of the first set of data bytes stored in the storing means with the second set of data bytes intercepted by the intercepting means so as to form a third set of data bytes which is subsequently transferred to the second processor;

means for writing data bytes of a fourth data element from a first cache memory of the first processor to the computer system memory; and means for writing selected data bytes of a fifth data element from a second cache memory of the second processor to the computer system memory so as to overwrite a portion of the fourth data element and form a sixth data element in the computer system memory.

22. A memory controller comprising:

means for writing data bytes of a first data element from a first cache memory of a first processor to a computer system memory; and means for writing selected data bytes of a second data element from a second cache memory of a second processor to said computer system memory so as to overwrite a portion of the first data element and form a third data element in the computer system memory.

23. The memory controller of claim 22 wherein said second data element writing means includes:

an input device, connected to the computer system memory, which receives the second data element and writes selected data bytes of the second data element into the computer system memory.

* * * * *